(12) United States Patent
Matsui et al.

(10) Patent No.: US 6,574,023 B2
(45) Date of Patent: Jun. 3, 2003

(54) LIGHT-BEAM DEFLECTING APPARATUS, MANUFACTURING METHOD OF LIGHT-BEAM DEFLECTING APPARATUS AND IMAGE-FORMING APPARATUS

(75) Inventors: Susumu Matsui, Tokyo (JP); Hiroshi Kobayashi, Tokyo (JP); Yuko Takahashi, Tokyo (JP); Naohiro Ono, Tokyo (JP); Hiroshi Miyakoshi, Tokyo (JP); Katsuji Sasaki, Kanagawa (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/908,046

(22) Filed: Jul. 18, 2001

(65) Prior Publication Data

US 2002/0015211 A1 Feb. 7, 2002

(30) Foreign Application Priority Data

Aug. 4, 2000 (JP) ........................ 2000-237518

(51) Int. Cl.$^7$ .............................................. G02B 26/08
(52) U.S. Cl. ...................... 359/199; 359/216; 310/67 R
(58) Field of Search ................................ 359/198, 199, 359/223, 200, 212, 216; 310/66, 67 R, 90

(56) References Cited

U.S. PATENT DOCUMENTS 5,692,287 A * 12/1997 Nakamura et al. ............ 29/558
5,716,036 A * 2/1998 Isobe et al. .................. 248/466

* cited by examiner

Primary Examiner—Euncha Cherry
(74) Attorney, Agent, or Firm—Frishauf, Holtz, Goodman & Chick, P.C.

(57) ABSTRACT

A light-beam deflecting apparatus is provided in which a polygon mirror is pushed against a flange to hold it stationary. The light-beam deflecting apparatus includes a base member; a polygon mirror rotatable with respect to the base member; a flange contacting the polygon mirror to hold the polygon mirror; and a pushing member to push the polygon mirror against the flange. One or both of contacting surfaces of the polygon mirror and the flange is/are finished to a surface roughness of Ry, which fulfills a first formula of Ry>3 μm or a second formula of 3 μm≦Ry≦20 μm.

16 Claims, 7 Drawing Sheets

LIGHT-BEAM DEFLECTING APPARATUS, MANUFACTURING METHOD OF LIGHT-BEAM DEFLECTING APPARATUS AND IMAGE-FORMING APPARATUS

BACKGROUND OF THE INVENTION

The present invention relates to a light-beam deflecting apparatus, in which a polygon mirror is pushed against a flange to hold it stationary, a manufacturing method of the light-beam deflecting apparatus and an image-forming apparatus.

Conventionally, electro-photographic image-forming apparatuses, such as laser-beam printers, digital copiers, etc., have employed a light-beam deflecting apparatus for scanning a light-beam, in order to write images onto a photoreceptor drum. In the conventional light beam deflection apparatus, a polygon mirror combined with magnets is rotatably inserted into a central axis of the base body with a bearing between them, and driving coils are disposed opposite the magnets so that a rotational torque, caused by the relative magnetic forces generated between the permanent magnets and the driving coils when electric currents flow into the driving coils, rotates the polygon mirror at a high rate, while forming an air gap between the base body and a rotating disk including the polygon mirror, etc.

In the abovementioned light-beam deflecting apparatus, since the polygon mirror is pushed against the flange to hold it stationary relative to the flange, contacting surfaces of both the polygon mirror and the flange should be finished as accurate surfaces to improve an inclined angle of a mirror surface of the polygon mirror. Such contacting surfaces are finished so that their surface roughness Ry is not greater than 1 $\mu$m (Ry$\leq$1 $\mu$m). In the conventional configuration, however, in which both the contacting surfaces push against each other to fix the polygon mirror onto the flange, there has been a fear that the position of the polygon mirror possibly deviates from its original position due to a centrifugal force generated by high-speed rotation, resulting in unbalance of the mass distribution of the rotating disk and an increase of vibrations.

SUMMARY OF THE INVENTION

To overcome the abovementioned drawbacks in the conventional light-beam deflecting apparatus, it is an object of the present invention to provide a light-beam deflecting apparatus which makes it possible to prevent the polygon mirror from deviating from the original position and to stably rotate the polygon mirror, even if the polygon mirror, pushed against the flange, rotates at a high rate during its operating time. It is also an object of the present invention to provide a method for manufacturing such light-beam deflecting apparatus, and further to provide an image-forming apparatus equipped with such light-beam deflecting apparatus.

Accordingly, to overcome the cited shortcomings, the abovementioned object of the present invention can be attained by a light-beam deflecting apparatus, methods for manufacturing the light-beam deflecting apparatus and image-forming apparatus described as follows.

(1) A light-beam deflecting apparatus, comprising: a base member; a polygon mirror being rotatable in respect to the base member; a flange contacting the polygon mirror to hold the polygon mirror; and a pushing member to push the polygon mirror against the flange; wherein one or both of contacting surfaces of the polygon mirror and the flange is/are finished to a surface roughness of Ry, which fulfills a first formula of Ry$\geq$3 $\mu$m.

(2) The light-beam deflecting apparatus of item 1, wherein surface roughness Ry fulfills a second formula of 3 $\mu$m$\leq$Ry$\leq$20 $\mu$m.

(3) The light-beam deflecting apparatus of item 1, wherein one or both of contacting surfaces of the polygon mirror and the flange is/are finished to surface roughness Ry, by employing one of an abrasive blasting, a cutting machining, a laser machining, a dry ice blasting, a chemical processing and a form rolling, or by employing a combination of a plurality of machining methods arbitrarily selected from them.

(4) A method for manufacturing a light-beam deflecting apparatus, which incorporates a polygon mirror being rotatable in respect to a base member and a flange contacting the polygon mirror to hold the polygon mirror, comprising the steps of: finishing one or both of contacting surfaces of the polygon mirror and the flange to a surface roughness of Ry, which fulfills a first formula of Ry$\geq$3 $\mu$m; and fixing the polygon mirror onto the flange by pushing the polygon mirror against the flange so that both of the contacting surfaces contact each other with a pushing force applied, in order to assemble the light-beam deflecting apparatus.

(5) The method of item 4, wherein surface roughness Ry fulfills a second formula of 3 $\mu$m$\leq$Ry$\leq$20 $\mu$m.

(6) The method of item 4, wherein one or both of the contacting surfaces is/are finished to surface roughness Ry, by employing one of an abrasive blasting, a cutting machining, a laser machining, a dry ice blasting, a chemical processing and a form rolling, or by employing a combination of a plurality of machining methods arbitrarily selected from them.

(7) The method of item 4, wherein one or both of the contacting surfaces is/are finished to surface roughness Ry, which fulfills a third formula of Ry<3 $\mu$m, before performing the finishing step.

(8) An image-forming apparatus, comprising: a photoreceptor; and the light-beam deflecting apparatus cited in item 1; wherein a light-beam, reflected from the polygon mirror, writes image information on the photoreceptor.

(9) The image-forming apparatus of item 8, wherein surface roughness Ry fulfills a second formula of 3 $\mu$m$\leq$Ry$\leq$20 $\mu$m.

(10) The image-forming apparatus of item 8, wherein one or both of contacting surfaces of the polygon mirror and the flange is/are finished to surface roughness Ry, by employing one of an abrasive blasting, a cutting machining, a laser machining, a dry ice blasting, a chemical processing and a form rolling, or by employing a combination of a plurality of machining methods arbitrarily selected from them.

Further, to overcome the abovementioned problems, another light-beam deflecting apparatus and methods for manufacturing such light-beam deflecting apparatus, embodied in the present invention, will be described as follows:

(11) A light-beam deflecting apparatus, characterized in that, a base member, a polygon mirror rotating in respect to the base member, a flange contacting the polygon mirror to hold the polygon mirror and a pushing member to push the polygon mirror against the flange are provided, and a surface roughness (Ry) of one or both of contacting surfaces of the polygon mirror and the flange fulfills Ry$\geq$3 $\mu$m.

According to the abovementioned light-beam deflecting apparatus, since a surface roughness (Ry) of at least one of contacting surfaces of the polygon mirror and the flange fulfills Ry≧3 μm, the frictional force between the contacting surfaces sufficiently increases when the polygon mirror is pushed against the flange to hold the polygon mirror, and thereby, the positional deviation of the polygon mirror, caused by the centrifugal force due to its high-speed rotating action during its operating time, hardly occurs, resulting in the stable rotation of the rotating disk without changing its vibration mode. Incidentally, in the present specification, the term of "surface roughness (Ry)" indicates the maximum height defined by JIS-B-0601.

It is desirable that the surface roughness (Ry) of the contacting surface fulfills the formula of 3 μm≦Ry≦20 μm. When the surface roughness (Ry) fulfills Ry ≦20 μm, it is possible to maintain the unit characteristics of the light-beam deflecting apparatus, such as the inclination angle of the mirror surface of the polygon mirror, etc., in an appropriate state. Further, the contacting surface can be finished to the abovementioned surface roughness (Ry), by employing one of an abrasive blasting, a cutting machining, a laser machining, a dry ice blasting, a chemical processing and a form rolling.

(12) A method for manufacturing a light-beam deflecting apparatus, characterized in that the method includes a process for finishing one or both of contacting surfaces of a polygon mirror, rotating in respect to a base member, and a flange, contacting the polygon mirror to hold the polygon mirror, to a surface roughness of Ry, which fulfills Ry≧3 μm or desirably 3 μm≦Ry≦20 μm, and an assembling process for fixing the polygon mirror onto the flange by contacting their contacting surfaces cc each other and by applying a pushing force to them.

According to the manufacturing method mentioned above, since the polygon mirror is fixed onto the flange by contacting the contacting surfaces of them each other and by applying a pushing force to them in its assembling process, after at least one of the contacting surfaces is finished to a surface roughness of Ry≧3 μm, the frictional force between the contacting surfaces sufficiently increases, and thereby, the positional deviation of the polygon mirror, caused by the centrifugal force due to its high-speed rotating action during its operating time, hardly occurs. Therefore, it becomes possible to manufacture a light-beam deflecting apparatus, in which the polygon mirror can stably rotates without generating any vibrations.

In this case, an abrasive blasting, a cutting machining, a laser machining, a dry ice blasting, a chemical processing or a form rolling can be employed for the surface-finish processing.

Further, it is possible to finish the contacting surface so that its surface roughness (Ky) fulfills Ry<3 μm, before performing the above-mentioned surface-finish processing. Of course, it is also applicable that the abovementioned surface-finish processing is performed without finishing the contacting surface to the surface roughness Ry<3 μm in advance.

Further, an image-forming apparatus, embodied in the present invention, characterized in that, the abovementioned light-beam deflecting apparatus is provided, and a light-beam, reflected from the polygon mirror, writes image information on the photoreceptor element. According to the image-forming apparatus, since the positional deviation of the polygon mirror, caused by the centrifugal force due to its high-speed rotating action during its operating time, hardly occurs, and the polygon mirror can stably rotates without generating any vibrations, it becomes possible to perform a stable image-forming operation for a long time. In addition, since the inclination angle of the mirror surface of the polygon mirror, as well as other characteristics, can be maintained in a desirable state, it becomes possible to contribute to a high-quality image-forming operation.

BRIEF DESCRIPTION OF THE DRAWINGS

Other objects and advantages of the present invention will become apparent upon reading the following detailed description and upon reference to the drawings in which:

FIG. 4($a$) shows changes of vibration amplitudes in a horizontal direction, and FIG. 4($b$) shows measuring results of inclination angles, each illustrating an effect of the first embodiment of the present invention;

FIG. 5($a$) shows an explanatory illustration for explaining a surface-finish processing performed by an abrasive blasting, and FIG. 5($b$) shows an explanatory illustration for explaining a surface-finish processing performed by a cutting machining, each illustrating a manufacturing method in the second embodiment of the present invention;

FIG. 6($a$) shows an explanatory illustration for explaining a surface-finish processing performed by a laser machining, and FIG. 6($b$) shows an explanatory illustration for explaining a surface-finish processing performed by a dry ice blasting, each illustrating a manufacturing method in the second embodiment of the present invention;

FIG. 7($a$) shows an explanatory illustration for explaining a surface-finish processing performed by a chemical processing, and FIG. 7($b$) shows an explanatory illustration for explaining a surface-finish processing performed by a form rolling, each illustrating a manufacturing method in the second embodiment of the present invention.

DETAILED DESCRIPTION OF THE PREFERRED EMBODIMENT

Referring to the drawings, the first, the second and the third embodiment of the present invention will be detailed in the following.

First Embodiment

Figure 1:
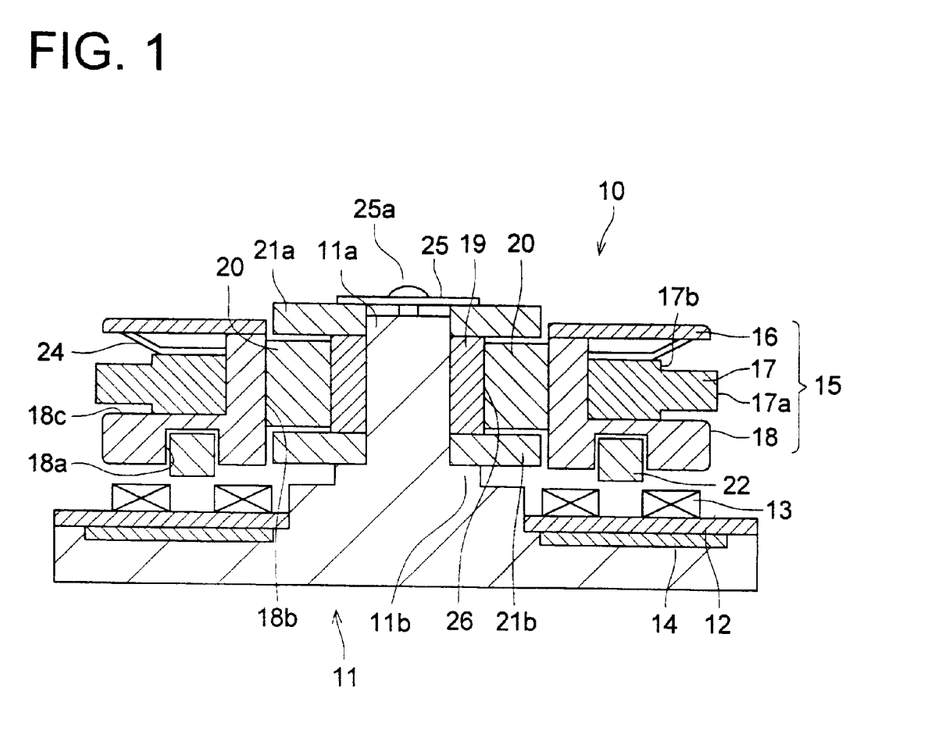
FIG. 1 shows a cross-sectional side view of a light-beam deflecting apparatus structured as a first embodiment of the present invention.

FIG. 1 shows a cross-sectional side view of a light-beam deflecting apparatus structured as a first embodiment of the present invention. As shown in FIG. 1, first light-beam deflecting apparatus 10 comprises base body 11 made of a metallic material such as aluminum, etc., printed circuit board 12 attached and fixed onto base body 11, coils 13 formed and fixed onto printed circuit board 12, fixed yoke 14 mounted into base body 11 so as to oppose to coils 13 and rotating disk 15, which rotates relative to base body 11.

Rotating disk 15 comprises polygon mirror 17 having mirror surface 17$a$ formed on it, flange 18 for holding polygon mirror 17 stationary relative to it, pushing plate 16 for pushing lower side surface 17$c$ of polygon mirror 17 against upper end surface 18$c$ of flange 18 by inserting leaf spring 24 between upper side surface 17$b$ of polygon mirror 17 and pushing plate 16 to fix polygon mirror 17 onto flange 18, bearing 20 fixed along inner circumferential surface 10b of flange 18, and magnets 22 inserted and fixed into concave holes 18a of flange 18. The disk 15 rotates in the integrated state. In addition, polygon mirror 17 and flange 18 are made of aluminum.

At first, lower thrust-bearing 21b is inserted into the lowest position of central axis 11a of base body 11, and then, radial-bearing 19 is fitted through central axis 11a, and further, upper thrust-bearing 21a is inserted into the upper position of central axis 11a. Screw 25a fastens fixing plate 25a to fix the abovementioned assembly. In the manner mentioned above, upper thrust-bearing 21a, radial-bearing 19 and lower thrust-bearing 21b are fixed onto base body 11 and form concave section 26. Upper thrust-bearing 21a, radial-bearing 19 and lower thrust-bearing 21b are made of ceramic materials.

Bearing 20 fixed to flange 18 is located in concave section 26 with gaps between them, so that the rotational torque, caused by the relative magnetic forces generated between magnets 22 and coils 13 when electronic currents flow into coils 13, rotates rotating disk 15 at a high rate while forming an air gap between concave section 26 and rotating disk 15.

Figure 2:
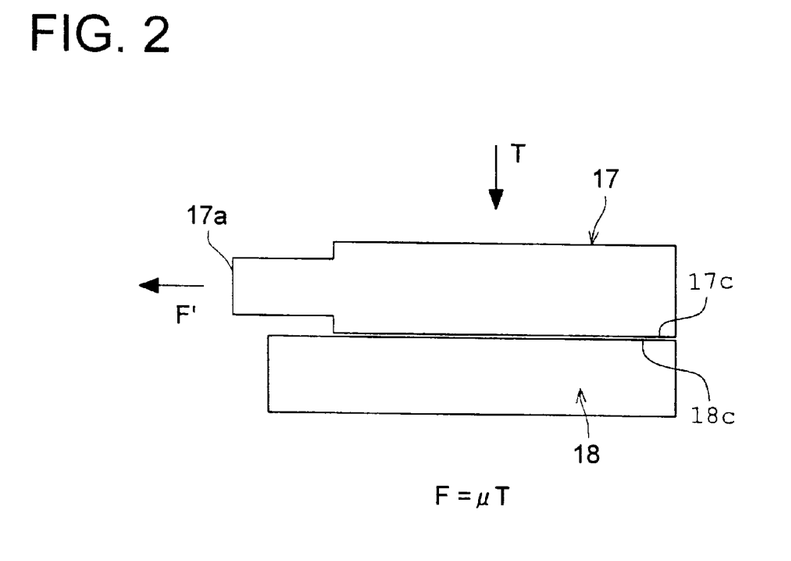
FIG. 2 shows a partial side view of a light-beam deflecting apparatus, for explaining an effect of the light-beam deflecting apparatus shown in FIG. 1.

The contacting surface of polygon mirror 17 with flange 18, mentioned above, will be detailed in the following. Since upper end surface 18c of flange 18 shown in FIG. 1 is finished so that its surface roughness (Ry) fulfills a condition of $3 \mu m \leq Ry \leq 20 \mu m$, the surface roughness is larger than that of conventional one. Further, since lower side surface 17c of polygon mirror 17 is finished so that its surface roughness (Ry) fulfills a condition of $Ry \leq 1 \mu m$, when upper end surface 18c and lower side surface 17c contact each other, a friction coefficient ($\mu$) between them becomes large value. Referring to FIG. 2, this effect will be explained as follow.

When lower side surface 17c of polygon mirror 17 is pushed against upper end surface 18c of flange 18 with pushing force T generated by leaf spring 24, which is inserted into a gap between pushing plate 16 and upper side surface 17b of polygon mirror 17, friction force F in a tangential direction between upper end surface 18c and lower side surface 17c can be expressed by the following equation.

$$F = \mu \times T$$

As mentioned above, since friction coefficient $\mu$ between upper end surface 18c and lower side surface 17c is larger than in the conventional apparatus, the value of friction force F becomes large. Even when centrifugal force F', caused by a high speed rotating operation of the polygon mirror when activating the light-beam deflecting apparatus, is applied to polygon mirror 17, as shown in FIG. 2, positional deviations of polygon mirror 17 and unnecessary vibrations of rotating disk 15 hardly occur, as compared to the conventional light-beam deflecting apparatus, since the abovementioned friction force F is larger than centrifugal force F'. Therefore, it becomes possible to stably rotate polygon mirror 17. In addition, provided that the surface roughness (Ry) at upper end surface 18c of flange 18 fulfills a condition of $Ry \leq 20 \mu m$, it becomes possible to maintain the unit characteristics of the light-beam deflecting apparatus, such as an inclination angle of the polygon mirror, etc., in good condition.

Figure 3:
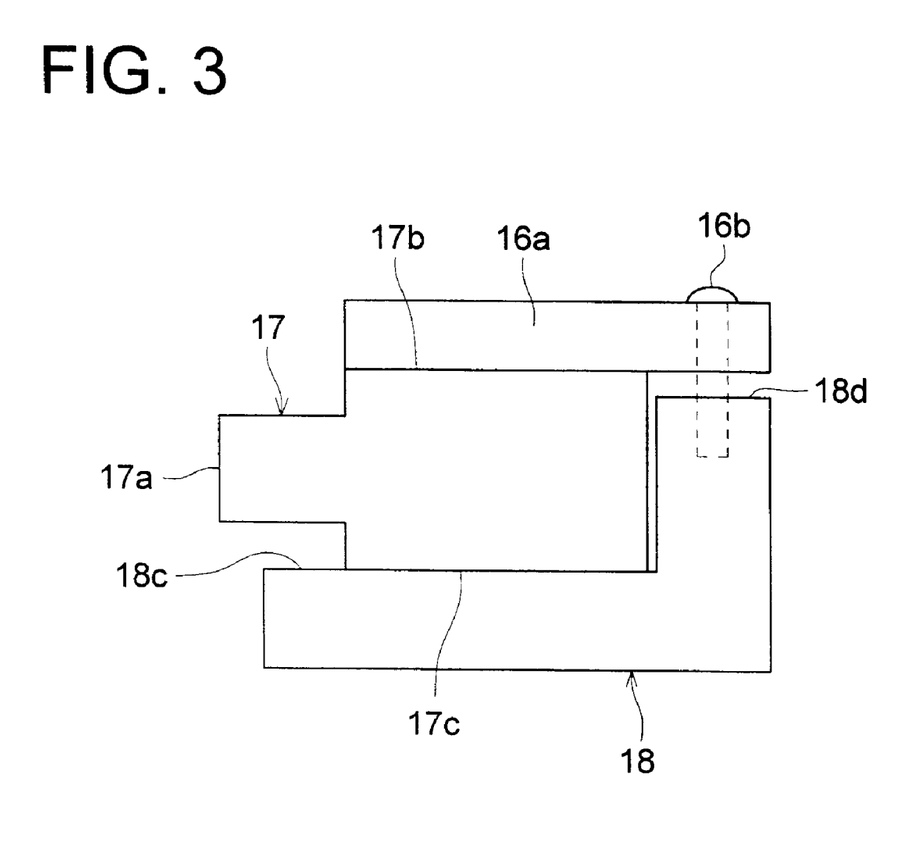
FIG. 3 shows a partial cross sectional view of a light-beam deflecting apparatus, illustrating a variation of it.

Next, referring to FIG. 3, a variation of the first embodiment will be detailed in the following. In the example shown in FIG. 3, leaf spring 24 shown in FIG. 1 is omitted, and pushing plate 16a directly pushes polygon mirror 17 against flange 18. Polygon mirror 17 is sandwiched by pushing plate 16a and upper end surface 18c of flange 18 and is fixed between them by fastening screw 16b into flange 18 with a fastening gap between pushing plate 16a and upper end surface 18c of flange 18. Accordingly, as well as the construction shown in FIG. 1, lower side surface 17c of polygon mirror 17 is pushed against upper end surface 18c of flange 18 with a constant pushing force, and upper end surface 18c is finished at surface roughness (Ry) in a range of $3 \mu m \leq Ry \leq 20 \mu m$.

EMBODIMENT EXAMPLES

The abovementioned effect of the first embodiment will be further detailed in the following, referring to embodiment examples. In the embodiment examples and the comparison examples, upper end surface 18c of flange 18 is finished by employing the abrasive blasting, so that its surface roughness (Ry) varies at various values within a range of 0.08–80 $\mu m$. The surface roughness (Ry) at lower side surface 17c of polygon mirror 17 is maintained at a constant value, namely, $Ry = 0.05 \mu m$. Incidentally, the surface roughness tester is employed for measuring the surface roughness, and the measuring results are evaluated based on JIS-B-0601 (Japan Industrial Standard corresponding to ISO 4287).

Figure 4:
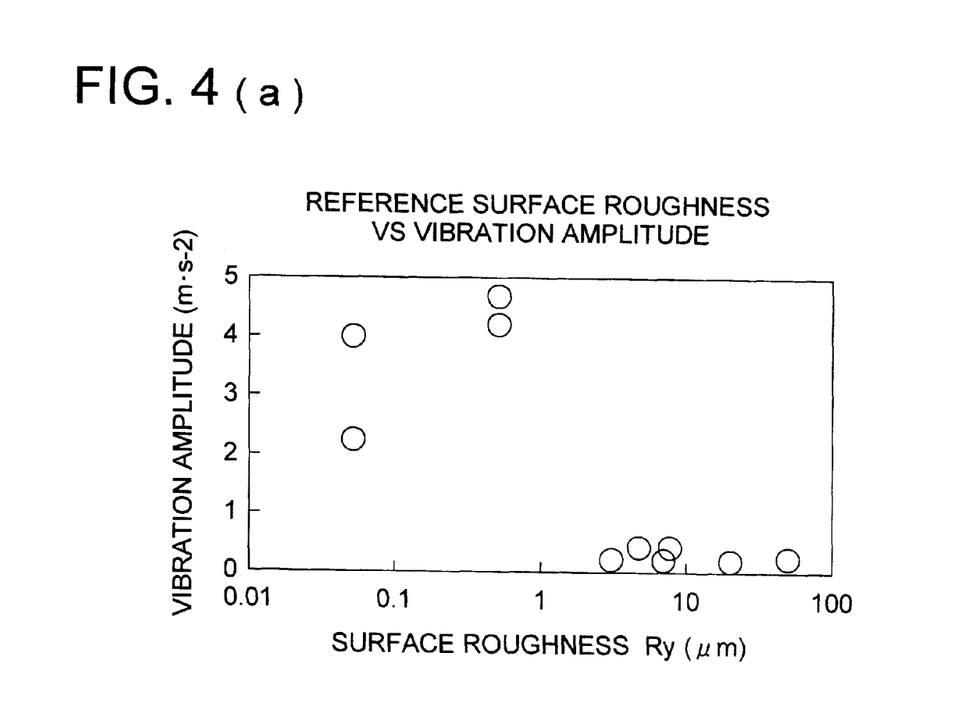

A plurality of light-beam deflecting apparatus, which are manufactured under the same conditions as those of the light-beam deflecting apparatus shown in FIG. 1, except that the surface roughness at upper end surface 18c of flange 18 is varied by the abovementioned method, are continuously operated for 24 hours at a rotating velocity of 50000 rpm, and the vibrations in a horizontal direction are measured before and after rotating the polygon mirror, in order to find changes of the vibration amplitudes in a horizontal direction before and after rotating the polygon mirror. FIG. 4(a) shows the changes of the vibration amplitudes in a horizontal direction. Since the change of the vibration amplitude corresponds to the change of mass balance in rotating disk 15 (shown in FIG. 1), the vibration amplitude in the horizontal direction increases according with the increase of the mass unbalance, when the polygon mirror deviates from the original position. As shown in FIG. 4(a), when the surface roughness (Ry) at upper end surface 18c of flange 18 is not lower than 3 $\mu m$, good results, in which the changes of the vibration amplitudes are small, are obtained in every cases. On the contrary, when the surface roughness (Ry) is not greater than 1 $\mu m$, the changes of the vibration amplitudes become considerably large.

Further, the inclination angle of the mirror surface of the polygon mirror in each light-beam deflecting apparatus is measured by irradiating laser-beam onto the mirror surface. FIG. 4(b) shows the measuring results of the inclination angles. As shown in FIG. 4(b), when the surface roughness (Ry) at upper end surface 18c of flange 18 is not greater than 20 $\mu m$, good results, in which the inclination angles are not so large, are obtained, though the inclination angle should be zero in an ideal state. On the contrary, when the surface roughness (Ry) exceeds 20 $\mu m$, the inclination angle is getting considerably large.

Second Embodiment

Next, as the second embodiment of the present invention, a method for manufacturing the light-beam deflecting apparatus, shown in FIG. 1, will be detailed in the following. FIGS. 5(a)-7(b) show explanatory illustrations for explaining various methods of finishing upper end surface 18c of flange 18, which is an objective surface for the surface processing, in a predetermined surface roughness.

Figure 5A:
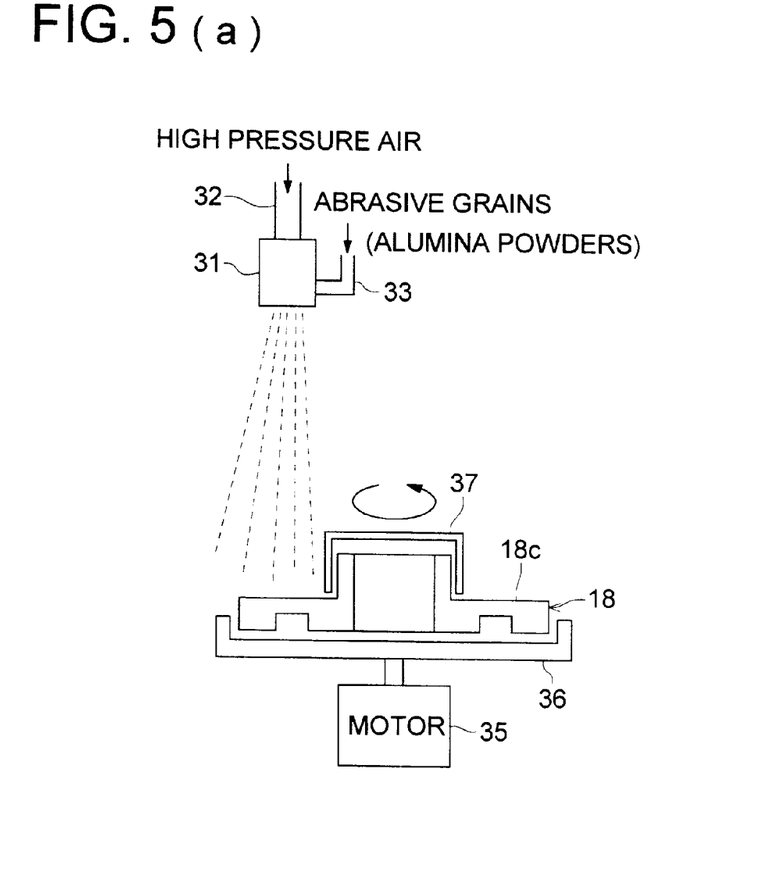

The method of the surface processing, shown in FIG. 5(a), employs the abrasive blasting. High-pressure air fed from pipeline 32 and abrasive grains, such as alumina powders, etc., fed from pipeline 33 are simultaneously supplied to nozzle 31, so that the abrasive grains are blasted onto upper end surface 18c of flange 18, serving as an objective surface, at a high rate from nozzle 31. Flange 18 is fixed onto work table 36 rotated by motor 35 to apply the abrasive blasting to upper end surface 18c while rotating flange 18 and protecting the non-objective surface of flange 18 with mask 37. Although alumina powders, having an average particle size of 100 µm, can be employed for the above purpose, it is possible to adjust the surface roughness (Ry) by appropriately changing the average particle size. Incidentally, although the surface roughness (Ry) at upper end surface 18c of flange 18, before the surface processing, can be set at Ry≦1 µm by the cutting machining, etc., it is also applicable to set it at Ry≧1 µm.

Figure 5B:
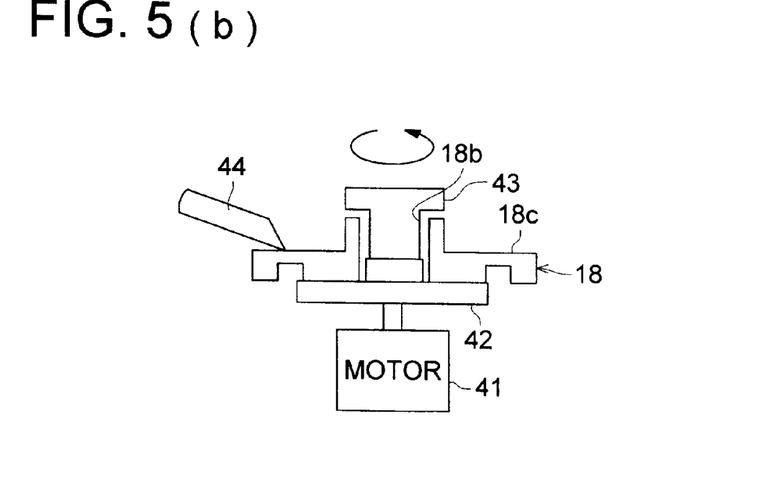

The method of the surface processing, shown in FIG. 5(b), employs the cutting machining. Flange 18 is fixed onto table 42 by inserting fixing tool 43 into inner circumferential surface 18b of flange 18, and then, upper end surface 18c is cut and ground by pushing cutting tool 44, made of a polycrystalline diamond, etc., onto it, while motor 41 is rotating flange 18 with table 42. Since the surface roughness of the tip of cutting tool 44 is directly transferred onto upper end surface 18c of flange 18, it is possible to adjust the surface roughness of upper end surface 18c by changing the surface roughness of the tip of cutting tool 44. Incidentally, although the surface roughness (Ry) at upper end surface 18c of flange 18, before the surface processing, can be set at Ry≦1 µm, it is also applicable to set it at Ry≧1 µm.

Figure 6A:
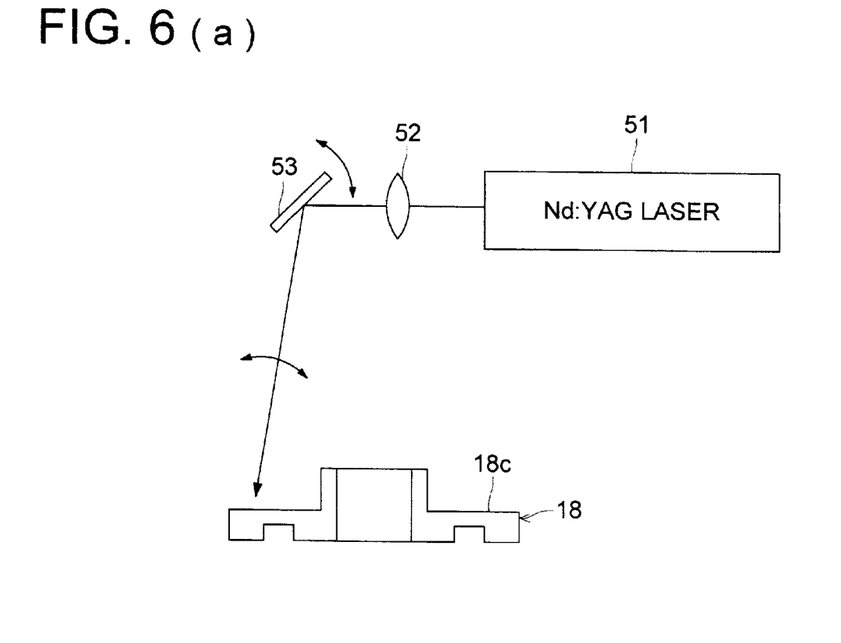

The method of the surface processing, shown in FIG. 6(a), employs the laser machining. The optical system, comprising Nd:YAG-laser 51, collecting lens 52 and deflecting mirror 53, revolves around flange 18 fixed stationary, to irradiate its laser-beam onto upper end surface 18c, while randomly changing the intensity of the laser-beam and/or randomly vibrating deflecting mirror 53. The surface roughness of upper end surface 18c can be adjusted by changing the output power and/or the irradiating time of Nd:YAG-laser 51. Instead of rotating the optical system, it is also applicable to rotate flange 18. Incidentally, although the surface roughness (Ry) at upper end surface 18c of flange 18, before the surface processing, can be set at Ry≦1 µm, it is also applicable to set it at Ry≧1 µm.

Figure 6B:
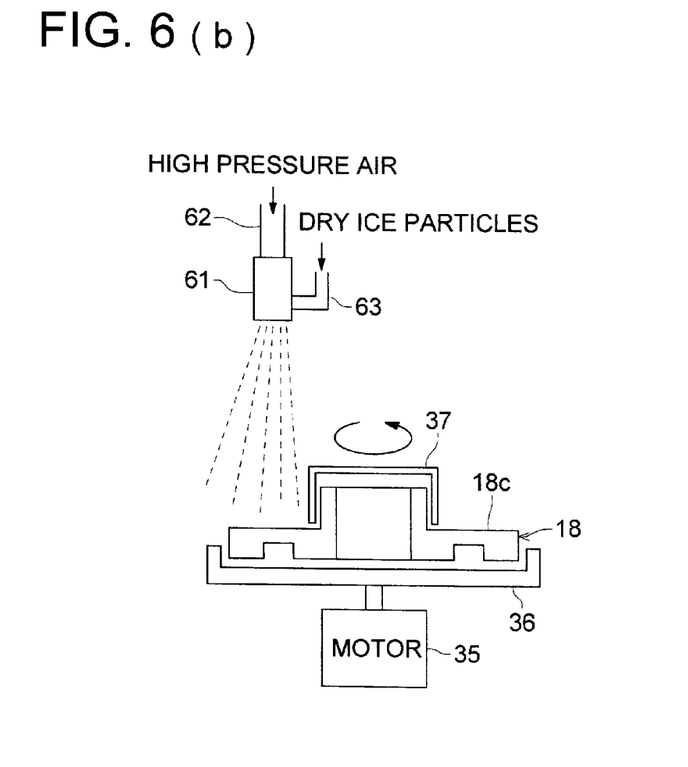

The method of the surface processing, shown in FIG. 6(b), employs the dry ice blasting. This method is basically the same method as that shown in FIG. 5(a), except that dry ice particles are employed as the abrasive grains. Concretely speaking, high-pressure air fed from pipeline 62 and dry ice particles fed from pipeline 63 are simultaneously supplied to nozzle 61, so that the abrasive grains are blasted onto upper end surface 18c of flange 18, serving as an objective surface, at a high rate from nozzle 61, while flange 18 is rotated by means of the rotating device similar to that shown in FIG. 5(a). Since the dry ice particles vaporize after blasting and remain no dust, it is possible to conduct a clean machining and to make the post-processing easy. Therefore, the dry ice particles are desirable for the abovementioned purpose. Further, the surface roughness can be adjusted by changing the particle size of the dry ice particles. Incidentally, although the surface roughness (Ry) at upper end surface 18c of flange 18, before the surface processing, can be set at Ry≦1 µm, it is also applicable to set it at Ry≧1 µm.

Figure 7A:
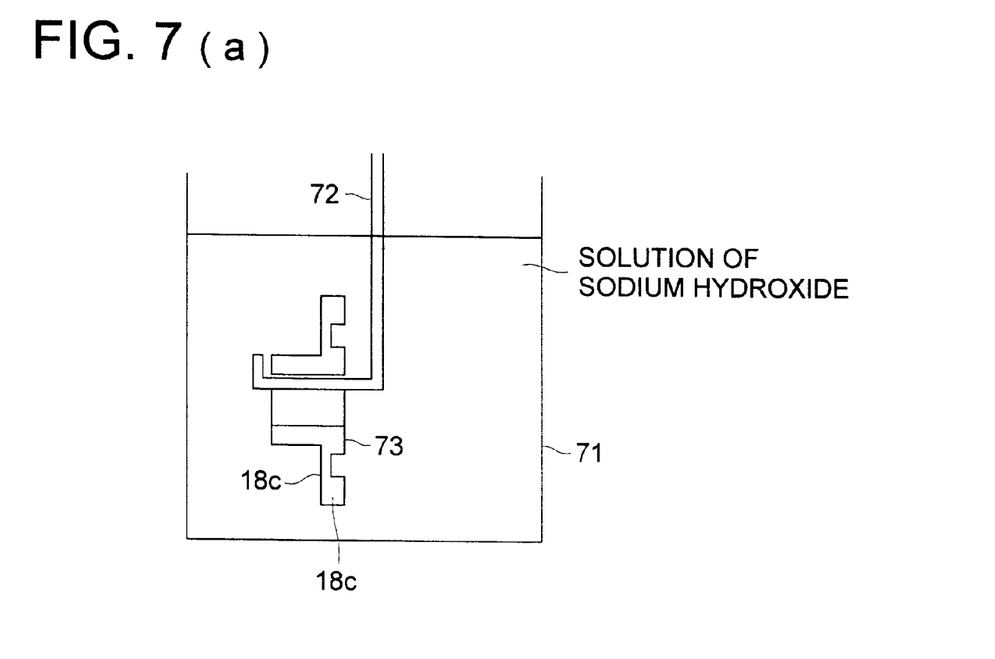
Figure 7B:
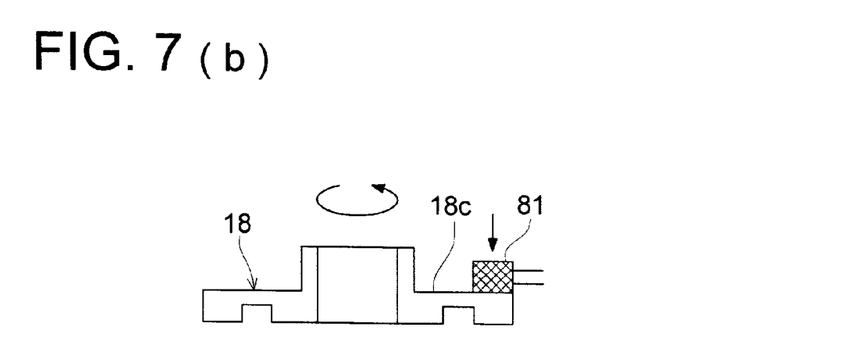

The method of the surface processing, shown in FIG. 7(a), employs the chemical processing. In case that flange 18 is made of aluminum, flange 18, non-objective surface of which is protected by mask 73, is dipped into a solution of sodium hydroxide by hanging it with hanging tool 72 to corrode upper end surface 18c. In this case, since upper end surface 18c is not corroded uniformly, an appropriate surface roughness can be obtained on upper end surface 18c. Further, the surface roughness can be adjusted by changing the density of the solution and/or the dipping time. In addition, either other alkalic solutions or strong acid solutions, such as sulfuric acid, etc., can be employed as the corroding solution. Incidentally, although the surface roughness (Ry) at upper end surface 18c of flange 18, before the surface processing, can be set at Ry≦1 µm, it is also applicable to set it at Ry≧1 µm.

The method of the surface processing, shown in FIG. 7(a), employs the form rolling. The surface roughness pattern formed on the press-surface of form-rolling tool 81 can be transferred onto upper end surface 18c of flange 18 by pushing form-rolling tool 81 against upper end surface 18c, while flange 18 is rotated by means of the rotating device similar to that shown in FIG. 5(b). Further, the surface roughness can be adjusted by changing the surface roughness pattern formed on the press-surface of form-rolling tool 81. Incidentally, it is desirable that the surface roughness (Ry) at upper end surface 18c of flange 18, before the surface processing, is set at Ry≦1 µm.

After upper end surface 18c of flange 18 is finished, so that its surface roughness (Ry) fulfills a condition of 3 µm≦Ry≦20 µm, by employing one of the abovementioned methods, the light-beam deflecting apparatus can be assembled by contacting lower side surface 17c of polygon mirror 17 with upper end surface 18c of flange 18, and pushing polygon mirror 17 against flange 18 with leaf spring 24 and pushing plate 16 to fix polygon mirror 17 onto flange 18 in a state of contacting both surfaces 17c, 18c each other with the pushing force of leaf spring 24.

Third Embodiment

Figure 8:
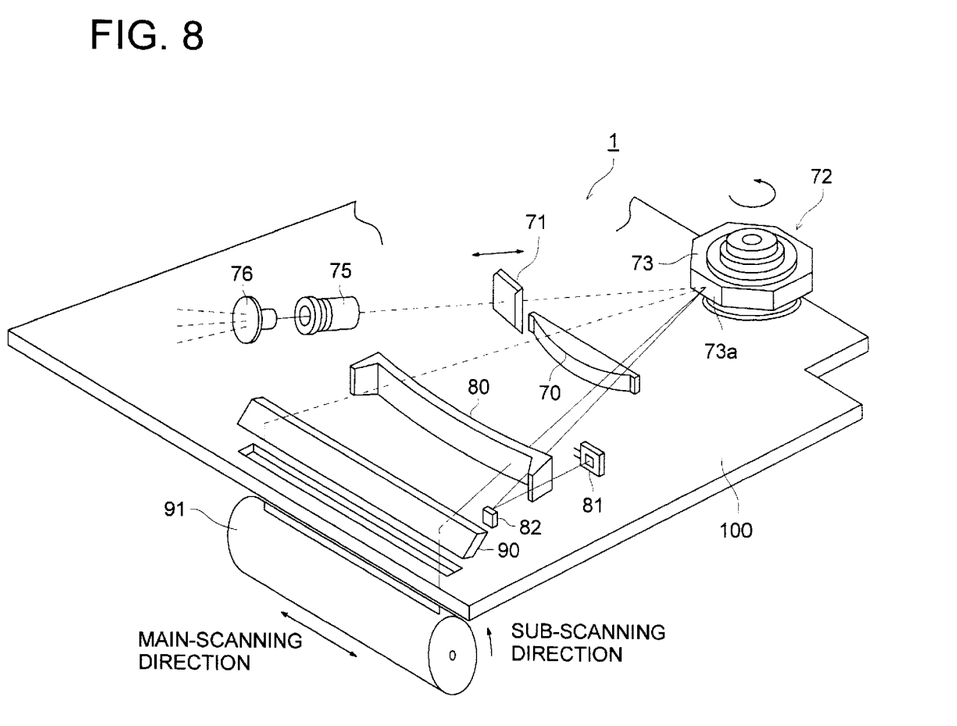
FIG. 8 shows a perspective view of a simplified structure of a light-beam scanning optical unit.

Next, as the third embodiment of the present invention, an example of the light-beam scanning optical unit, which is employed in the image-forming apparatus, and incorporates the light-beam deflecting apparatus shown in FIG. 1, will be detailed in the following, referring to FIG. 8. FIG. 8 shows a perspective view of the simplified structure of the light-beam scanning optical unit.

As shown in FIG. 8, the light-beam scanning optical unit comprises: light-beam deflecting apparatus 72 having polygon mirror 73 and fixed on base plate 100; semiconductor laser 76; collimator lens 75 (the optical system for shaping the light-beam); first cylindrical lens 71; fθ lens 70; second cylindrical lens 80; reflecting mirror 90; timing detecting mirror 82; and synchronized detector 81. The laser beam emitted from semiconductor laser 76 is collimated into a parallel light (a collimated beam) by collimator lens 75, and the collimated beam enters into polygon mirror 73, rotating in the arrow direction shown in the drawing, after passing through first cylindrical lens 71 in the first image optical system. The light-beam reflected from mirror surface 73a of polygon mirror 73 passes through fθ lens 70 and second cylindrical lens 80 in the second image optical system, and is further reflected by reflecting mirror 90, so that the light-beam, having a predetermined spot-diameter, scans the circumferential surface of photoreceptor drum 91 incorporated in the image-forming apparatus. Synchronizing signals in a main-scanning direction are detected at every time before starting the scanning action of one scanning line by synchronized detector 81 into which the light-beam, reflected from timing detecting mirror 82, enters. While, photoreceptor drum 101 rotates in a sub-scanning direction, synchronizing with the synchronizing signals detected by synchronized detector 81.

According to the abovementioned configuration, it is possible to write image information onto the circumferential surface of photoreceptor drum 91 with the laser-beam emitted from semiconductor laser 76. Further, in light-beam deflecting apparatus 72 embodied in the present invention, since the positional deviation of polygon mirror 73, caused by the centrifugal force due to its high-speed rotating action during its operating time, hardly occurs, and thereby, polygon mirror 73 can stably rotate without generating any vibrations, it becomes possible to perform a stable image-forming operation for a long time. In addition, since the inclination angle of mirror surface 73a of polygon mirror 73, as well as other characteristics, can be maintained in a desirable state, it becomes possible to perform a high-quality image-forming operation.

Although the present invention has been described referring to the abovementioned embodiments, the scope of the present invention is not limited to the abovementioned embodiments. Disclosed embodiments can be varied by a skilled person without departing from the spirit and scope of the present invention. For instance, other materials, such as resin materials, etc., can be employed for the polygon mirror and the flange. Further, although the contacting surface of the flange is finished as a coarse surface in the abovementioned embodiments, it is also applicable that only the contacting surface of the polygon mirror is finished as a coarse surface, or both contacting surfaces are finished as a coarse surface. Still further, it is also applicable that the surface processing is performed by employing a plurality of the methods mentioned above.

According to the light-beam deflecting apparatus embodied in the present invention, it becomes possible to prevent the polygon mirror from deviating from the original position and to stably rotate the polygon mirror, even if the polygon mirror, pushed against the flange, rotates at a high rate during its operating time. Further, it is also possible to maintain the unit characteristics of the light-beam deflecting apparatus, such as the inclination angle of the mirror surface of the polygon mirror, etc., in an appropriate state.

Further, according to the method of manufacturing the light-beam deflecting apparatus, embodied in the present invention, it becomes possible to manufacture the light-beam deflecting apparatus in which the positional deviation of the polygon mirror hardly occurs, even if the polygon mirror, pushed against the flange, rotates at a high rate during its operating time, and thereby, the polygon mirror can stably rotate, and the unit characteristics can be maintained in an appropriate state.

Further, according to the image-forming apparatus equipped with the light-beam deflecting apparatus embodied in the present invention, it becomes possible to perform a stable image-forming operation for a long time, and to contribute to a high-quality image-forming operation.

What is claimed is:

1. A light-beam deflecting apparatus comprising:
a base member;
a flange which is rotatable with respect to said base member;
a polygon mirror which is rotatable with said flange and which deflects a light-beam while rotating with said flange; and
a pushing member which pushes a first surface of said polygon mirror so that a second surface of said polygon mirror press-contacts a contacting surface of said flange;
wherein at least one of said second surface of said polygon mirror and said contacting surface of said flange is finished to a surface roughness such that a friction force generated between said second surface of said polygon mirror and said contacting surface of said flange is greater than a position-deviatory force applied to said polygon mirror when said polygon mirror is rotating with said flange at an operating velocity.

2. The light-beam deflecting apparatus of claim 1, wherein said position-deviatory force is a centrifugal force induced in said polygon mirror.

3. The light-beam deflecting apparatus of claim 1, wherein said surface roughness is greater than or equal to 3 $\mu$m.

4. The light-beam deflecting apparatus of claim 1, wherein said surface roughness is greater than or equal to 3 $\mu$m and less than or equal to 20 $\mu$m.

5. The light-beam deflecting apparatus of claim 1, wherein at least one of said second surface of said polygon mirror and said contacting surface of said flange is finished to said surface roughness by employing one of an abrasive blasting, a cutting machining, a laser machining, a dry ice blasting, a chemical processing and a form rolling, so as to increase said friction force generated between said second surface of said polygon mirror and said contacting surface of said flange while maintaining a dimensional accuracy of said polygon mirror within an allowable range.

6. A method fat manufacturing a light-beam deflecting apparatus which includes a base member, a flange that is rotatable with respect to said base member, and a polygon mirror that deflects a light-beam while rotating with said flange, said method comprising:
roughening at least one of a contact surface of said polygon mirror and a contacting surface of said flange by applying a surface treatment; and
fixing said polygon mirror onto said flange by pushing said polygon mirror against said flange so that said contact surface of said polygon mirror press-contacts said contacting surface of said flange;
wherein at least one of said contact surface of said polygon mirror and said contacting surface is roughened to a surface roughness such that a friction force generated between said contact surface of said polygon mirror and said contacting surface of said flange is greater than a position-deviatory force applied no said polygon mirror when said polygon mirror is rotating with said flange at an operating velocity.

7. The method of claim 6, wherein said position-deviatory force is a centrifugal force induced in said polygon mirror.

8. The method of claim 6, wherein said surface roughness is greater than or equal to 3 $\mu$m.

9. The method of claim 6, wherein said surface roughness is greater than or equal to 3 $\mu$m and less than or equal to 20 $\mu$m.

10. The method of claim 6, wherein said surface treatment comprises one of an abrasive blasting, a cutting machining, a laser machining, a dry ice blasting, a chemical processing and a form rolling.

11. The method of claim 6, wherein, prior to performing said roughening, at least one of said contact surface of said polygon mirror and said contacting surface of said flange is finished to a surface roughness which is less than 3 $\mu$m.

12. An image-forming apparatus comprising:
photoreceptor; and
a light-beam deflecting apparatus which exposes an image onto said photoreceptor by scanning a light-beam;

wherein said light-beam deflecting apparatus comprises:
a base member;
a flange which is rotatable with respect to said base member;
a polygon mirror which is rotatable with said flange and which deflects a light-beam while rotating with said flange; and
a pushing member which pushes a first surface of said polygon mirror so that a second surface of said polygon mirror press-contacts a contacting surface of said flange;
wherein at least one of said second surface of said polygon mirror and said contacting surface of said flange is finished to a surface roughness such that a friction force generated between said second surface of said polygon mirror and said contacting surface of said flange is greater than a position-deviatory force applied to said polygon mirror when said polygon mirror is rotating with said flange at an operating velocity.

13. The image-forming apparatus of claim 12, wherein said position-deviatory force is a centrifugal force induced in said polygon mirror.

14. The image-forming apparatus of claim 12, wherein said surface roughness is greater than or equal to 3 μm.

15. The image-forming apparatus of claim 12, wherein said surface roughness is greater than or equal to 3 μm arid less than or equal to 20 μm.

16. The image-forming apparatus of claim 12, wherein at least one of said second surface of said polygon mirror and said contacting surface of said flange is finished to said surface roughness by employing one of an abrasive blasting, a cutting machining, a laser machining, a dry ice blasting, a chemical processing and a form rolling, so as to increase said friction force generated between said second surface of said polygon mirror and said contacting surface of said flange while maintaining a dimensional accuracy of said polygon mirror within an allowable range.

* * * * *